(12) United States Patent
Espino

(10) Patent No.: US 9,177,714 B2
(45) Date of Patent: Nov. 3, 2015

(54) TRANSVERSE SHIELD WIRE FOR ENERGY TRANSFER ELEMENT

(71) Applicant: POWER INTEGRATIONS, INC., San Jose, CA (US)

(72) Inventor: Marvin Cruz Espino, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 213 days.

(21) Appl. No.: 13/729,949

(22) Filed: Dec. 28, 2012

(65) Prior Publication Data

US 2014/0185337 A1 Jul. 3, 2014

(51) Int. Cl.
| | |
|---|---|
| H01F 27/36 | (2006.01) |
| H01F 17/04 | (2006.01) |
| H01F 38/12 | (2006.01) |
| H01F 27/30 | (2006.01) |
| H01F 27/32 | (2006.01) |
| H02M 3/335 | (2006.01) |
| H01F 27/28 | (2006.01) |

(52) U.S. Cl.
CPC ............ *H01F 27/362* (2013.01); *H01F 27/325* (2013.01); *H01F 27/2823* (2013.01); *H02M 3/33523* (2013.01)

(58) Field of Classification Search
CPC ..... H01F 27/38; H01F 27/325; H01F 27/345; H01F 27/362; H01F 27/289; H01F 27/34
USPC .................... 336/84 C, 84 R, 221, 198, 84 M
See application file for complete search history.

(56) References Cited

U.S. PATENT DOCUMENTS

| | | | | | |
|---|---|---|---|---|---|
| 4,704,592 | A | * | 11/1987 | Marth et al. | 336/83 |
| 6,002,319 | A | * | 12/1999 | Honma | 336/73 |
| 6,262,870 | B1 | * | 7/2001 | Yumoto | 361/38 |
| 6,950,291 | B1 | * | 9/2005 | Andres et al. | 361/38 |
| 7,256,675 | B2 | * | 8/2007 | Chen | 336/180 |
| 7,456,717 | B2 | * | 11/2008 | Grueso et al. | 336/192 |
| 7,759,940 | B2 | * | 7/2010 | Forgang et al. | 324/334 |
| 7,768,369 | B2 | * | 8/2010 | Park | 336/84 C |
| 8,023,294 | B2 | * | 9/2011 | Ryan et al. | 363/40 |
| 2007/0152794 | A1 | * | 7/2007 | Chen | 336/212 |
| 2009/0251273 | A1 | * | 10/2009 | Park | 336/84 |

* cited by examiner

*Primary Examiner* — Elvin G Enad
*Assistant Examiner* — Joselito Baisa
(74) *Attorney, Agent, or Firm* — Blakely Sokoloff Taylor & Zafman LLP

(57) ABSTRACT

Energy transfer elements having a shield to reduce EMI while maintaining a low profile are disclosed. In one example, the transformer may include a transverse shield wire that may be utilized to keep displacement current within the energy transfer element. While windings of the energy transfer element are generally wound axially around the axis of a bobbin in a direction generally perpendicular to the axis of the bobbin, the transverse shield wire may be placed on the bobbin extending over multiple power windings of the energy transfer element in a transverse direction. The transverse shield wire may be situated outside all other windings wound around the bobbin. In some examples, one end of the transverse shield wire may be coupled to a switching node of the energy transfer element while the other end of the transverse shield wire may be coupled to a winding of the energy transfer element.

20 Claims, 7 Drawing Sheets

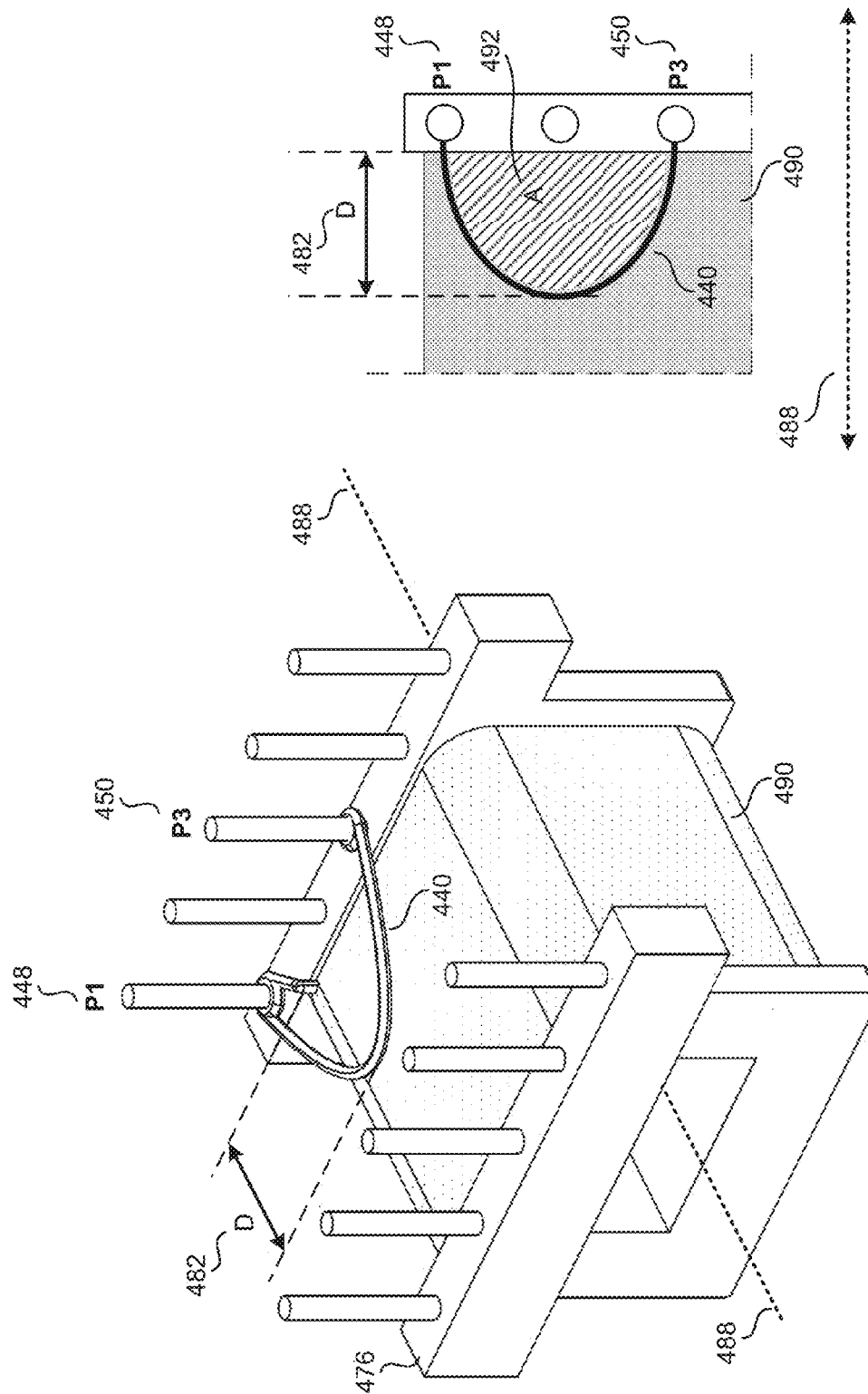

TRANSVERSE SHIELD WIRE FOR ENERGY TRANSFER ELEMENT

BACKGROUND

1. Field

The present disclosure relates generally to energy transfer elements and, more specifically, to energy transfer elements utilized with power converters.

2. Discussion of the Related Art

Many electrical devices, such as cell phones, personal digital assistants (PDA's), laptops, etc., utilize power to operate. Because power is generally delivered through a wall socket as high voltage alternating current (ac), a device, typically referred to as a power converter, can be utilized to transform the high voltage ac input to a well regulated direct current (dc) output through an energy transfer element. Switched mode power converters are commonly used due to their high efficiency, small size, and low weight to power many of today's electronics. In operation, a switch is utilized to provide the desired output quantity by varying the duty cycle (typically the ratio of the on-time of the switch to the total switching period), varying the switching frequency, or varying the number of pulses per unit time of the switch in a power converter. A controller may be utilized to provide output regulation by sensing and controlling the output in a closed loop. The controller may receive a feedback signal representative of the output and vary one or more parameters of the switch in response to the feedback signal to regulate the output.

The energy transfer element in the power supply, sometimes called a transformer or a coupled inductor, is an inductive component with coils of wire (also referred to as windings) which are wound around a structure called a bobbin. The bobbin provides support for the coils of wire and also provides an area for a core of magnetically active material (such as ferrite or steel) to be inserted so that the windings can encircle the core. The area around the bobbin where the windings can be wound is often referred to as the bobbin window.

During operation, the energy transfer element allows for the transfer of energy between an input side (also referred to as a primary side) of the power converter and an output side (also referred to as a secondary side) of the power converter. A winding utilized for power conversion is generally referred to as a power winding. In addition, the energy transfer element may include additional windings that may not take part in the power conversion function. A winding that may provide both shielding functions and power conversion functions, such as, for example, a bias winding (also referred to as an auxiliary winding), which provides a bias voltage to operate a component of the controller, is generally considered a power winding. A power winding coupled to the input side of the power converter is generally called a primary winding (or input winding) while a power winding coupled to the output side is generally referred to as a secondary winding (or output winding). Additional windings, such as balance shield windings and cancellation shield windings, are sometimes included in the general category of shield windings to distinguish these windings from power windings that are used for the power converter to operate.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4C is a further perspective view illustrating the example energy transfer element, in accordance with teachings of the present disclosure.

FIG. 4D is a top view illustrating the various dimensions of the example energy transfer element in accordance with teachings of the present disclosure.

Figure 1A:
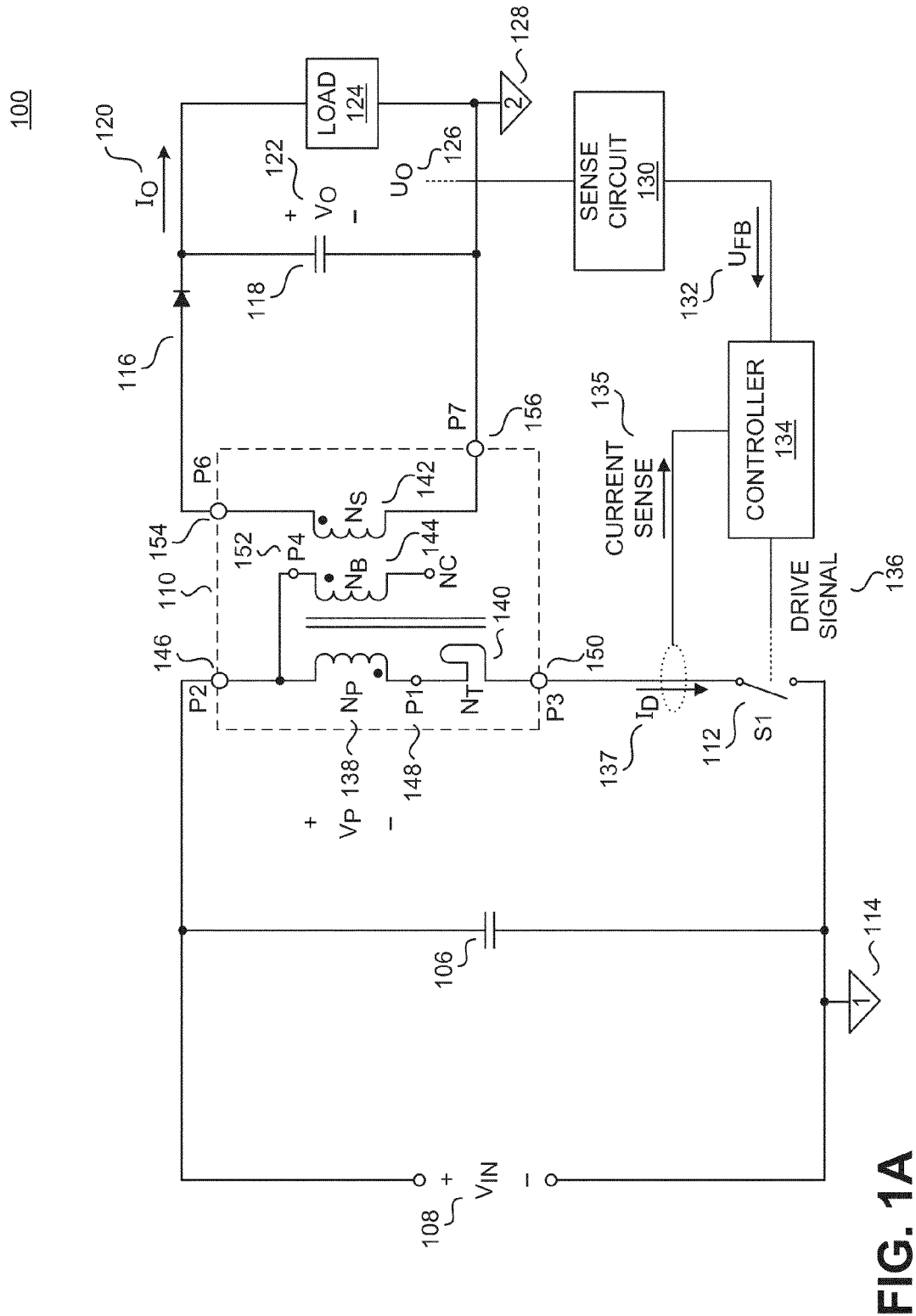
FIG. 1A is a schematic diagram illustrating an example power converter including an energy transfer element, in accordance with teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of the various embodiments. Also, common but well-understood elements that are useful or necessary in a commercially feasible embodiment are often not depicted in order to facilitate a less obstructed view of these various embodiments.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The energy transfer element included in a power converter allows for the transfer of energy between an input side (also referred to as a primary side) of the power converter and an output side (also referred to as a secondary side) of the power converter. Every conductive element in a power converter may be electrically coupled to the space external to the power converter through an electric field. Since there is a difference in voltage between any two points in an electric field, there is also a voltage difference between every conductive element in the power converter and an arbitrary reference location outside of the power converter, which is often referred to as earth ground, sometimes simply referred to as earth or as ground. The voltage between a conductive element and earth may be positive, negative, or zero.

The coupling of the electric field and the associated voltage are typically represented as stray capacitance in an electric circuit. When the voltage between a conductive element and earth change value, a displacement current in the stray capacitance that couples the conductive element to earth is created. A large rate of change in the voltage can produce a substantial displacement current. The current may be referred to as displacement current to distinguish it from conduction current. A displacement current may refer to a changing electric field in space that is equivalent to a movement of electric charge in a conductive element. Current that is a movement of charge in a conductive element may be referred to as conduction current.

A dc current generally has a constant value with respect to time. In contrast, an ac current generally has a value which varies with time. A current in general can be a sum of a dc current and an ac current. Conduction current may be a sum of a dc current and an ac current. However, a displacement current is generally only an ac current because an ac current may be equivalent to a changing electric field. Displacement currents are generally detected as common mode noise (or emissions) of the power converter.

Current that has the same magnitude and direction (toward the power converter or away from the power converter) in two or more conductive elements at the same time is generally called common mode current. Current that has the same magnitude but opposite directions in two conductive elements is generally called differential current. The common mode current in the input inductor is generally a noise current that does not contribute to the power received by the power converter. Common mode current originates primarily from the fast switching of high voltage in the power converter. A power converter typically limits noise current to meet the limits specified by regulatory agencies.

Shield windings, such as balance shield windings and cancellation shield windings, may be utilized to reduce common mode current (e.g., noise current) in the power converter. In general, the shield windings may be used to restrict the displacement current to a path that does not include the input conductive elements of the power converter. Further, the shield windings may be used to keep displacement current within the energy transfer element. The shield windings accomplish their purpose by introducing electric fields at the proper place and at the proper strength to steer the displacement current to take a desired path.

Construction of an energy transfer element includes determining various properties, such as the size of the bobbin, wire size of the windings, the number of turns for each winding to meet desired specifications, and the like. For energy transfer elements utilizing low profile bobbins, the bobbin window may be quite small and can limit the number of windings or the number of turns per winding. For example, the bobbin window may be so small that there is insufficient room for both a cancellation shield winding and a balance shield winding or that there is insufficient room for the required number of turns of each shield winding to keep displacement current within the energy transfer element. In addition, more windings and/or an increased number of turns per winding may decrease full power efficiency and an increase in the no-load consumption of a power converter.

Thus, various embodiments are described below relating to a transformer design to reduce electromagnetic interference (EMI) while maintaining a low profile. In some examples, the transformer may include a transverse shield wire that may be utilized to keep displacement current within the energy transfer element. In other words, the transverse shield wire may be utilized as a shield winding of the energy transfer element. While windings of the energy transfer element are generally wound axially around the axis of the bobbin in a direction generally perpendicular to the axis of the bobbin, the transverse shield wire may be placed on the bobbin in a direction that is not generally perpendicular to the axis of the bobbin. For example, at least a portion of the transverse shield wire may, in some examples, may be configured to extend in a direction that is parallel to axis of the bobbin. In other examples, the transverse shield wire may be configured to cross multiple power windings of the energy transfer element in a transverse direction. In addition, the transverse shield wire may be situated outside all other windings wound around the bobbin. In some examples, one end of the transverse shield wire may be coupled to a switching node of the energy transfer element while the other end of the transverse shield wire may be coupled to a winding of the energy transfer element. The term "switching node" may generally refer to a node at which the voltage and/or current at that node varies over time. On the other hand, the term non-switching node may generally refer to a node at which the voltage and/or current does not substantially vary over time.

Referring first to FIG. 1, a schematic diagram of an example power converter 100 is illustrated including an input capacitor 106, an energy transfer element 110, a switch S1 112, an input return 114, a rectifier 116 (also referred to as an output diode), an output capacitor 118, an output return 128, a sense circuit 130, and a controller 134. Energy transfer element 110 is further shown as including a primary winding 138 with $N_P$ number of turns, a transverse shield wire $N_T$ 140, a secondary winding 142 with $N_S$ number of turns, a balance shield winding 144 with $N_B$ number of turns, and nodes P2 146, P1 148, P3 150, P4 152, P6 154, and P7 156. Also shown in FIG. 1 are an input voltage $V_{IN}$ 108, an output current $I_O$ 120, an output voltage $V_O$ 122, an output quantity $U_O$ 126, a feedback signal $U_{FB}$ 132, a current sense signal 135, a drive signal 136, and switch current $I_D$ 137. In the illustrated example, the power converter 100 is shown as having a flyback topology for explanation purposes. It is appreciated that other known topologies and configurations of power converters may also benefit from the teachings of the present disclosure.

The power converter 100 provides output power to a load 124 from an unregulated input voltage $V_{IN}$ 108. In one embodiment, the input voltage $V_{IN}$ 108 is a rectified and filtered ac line voltage. In another embodiment, the input voltage $V_{IN}$ 108 is a dc input voltage. The input voltage $V_{IN}$ 108 is coupled to the energy transfer element 110. In some embodiments, the energy transfer element 110 may be a coupled inductor. In other embodiments, the energy transfer element 110 may be transformer.

As mentioned above, the energy transfer element 110 may have power windings utilized for power conversion and additional windings, such as shield windings, that are utilized to keep displacement current within the energy transfer element 110. In the example shown in FIG. 1A, primary winding 138 and secondary winding 142 are power windings and can also be referred to as the input and output windings of the energy transfer element, respectively.

In addition, energy transfer element 110 has internal nodes and external nodes. Internal nodes may not carry conduction current to or from circuits external to the energy transfer element 110 and may not be accessible outside energy transfer element 110. On the other hand, external nodes may be accessible from outside energy transfer element 110 and may carry conduction current to or from circuits external to energy transfer element 110. In one example, an external node may be mechanically coupled to a pin, terminal, post, or pad of an energy transfer element that carries conduction current to or from a circuit external to the energy transfer element. Further, an internal node may be mechanically coupled to a pin, terminal, post, or pad of an energy transfer element that does not carry conduction current to or from circuits external from the energy transfer element. It is sometimes convenient for the manufacturer of an energy transfer element to use a pin, terminal, post, or pad of an energy transfer element to fasten one end of a winding or loop that will carry no conduction current. The energy transfer element 110 shown in FIG. 1A includes nodes P2 146, P1 148, P3 150, P4 152, P6 154, and P7 156, which may correspond to pins, terminals, posts, or pads of an energy transfer element that are utilized to fasten one end of a winding or loop. However, it should be appreciated that nodes P2 146, P1 148, P3 150, P4 152, P6 154, and P7 156 may correspond to electrical nodes.

Input voltage $V_{IN}$ 108 is coupled to one end of primary winding 138 and to switch S1 112. In the example shown, the end of primary winding 138 not denoted with a dot is coupled to the positive end of the input voltage $V_{IN}$ 108. The dot may be utilized to denote the polarity of the windings with respect to each other. As illustrated, one end of primary winding 138 is coupled to input voltage $V_{IN}$ 108 through node P2 146. Node P2 146 is one example of an external node. The other end of primary winding 138 (the end with the dot) is coupled to one end of transverse shield wire $N_T$ 140 through node P1 148 while the other end of transverse shield wire $N_T$ 140 is coupled to switch S1 112 through node P3 150. Node P1 148 is one example of an internal node while P3 150 is one example of an external node. As will be further discussed, the transverse shield wire $N_T$ 140 may be wound transverse to the power windings of energy transfer element 110. The transverse shield wire $N_T$ 140 may be utilized in addition or in lieu of an additional shield winding to keep displacement current within the energy transfer element 110. In addition, node P3 150 may also be considered a switching node, as the voltage at node P3 150 may vary over time due to the switching action of switch S1 112. Although not shown, in other examples, one end of transverse shield wire $N_T$ 140 may instead be coupled to any switching node of power converter 100 while the other end of transverse shield wire $N_T$ 140 may be coupled to any winding of power converter 100. For example, the transverse shield wire $N_T$ 140 may be coupled between node P6 154 and the secondary winding 142.

Further illustrated in FIG. 1A is balance shield winding 144. It should be appreciated that balance shield winding 144 is also a shield winding that may optionally be included to keep displacement current within the energy transfer element 110. One end (the end with the dot) of balance shield winding 144 may be coupled to primary winding 138 through node P4 152. Further, one end (the end with the dot) of balance shield winding 144 may also be coupled to input voltage $V_{IN}$ 108 through node P4 152. The other end (the end without the dot) of the balance shield winding 144 may not be coupled and hence labeled "NC."

The energy transfer element 110 also includes secondary winding 142, which is coupled to rectifier 116 through node P6 154. As illustrated, the end of the secondary winding 142 denoted with a dot is coupled to rectifier 116. The secondary winding 142 may also be coupled to output capacitor 118 through node P7 156. Both nodes P6 154 and P7 156 are examples of external nodes. The energy transfer element 110 in accordance with various embodiments may utilize both axial windings and transverse windings. For example, an axial winding may refer to coils of wire that are wrapped around the core around the axis of the core, while a transverse winding may refer to a wire that is wrapped generally in the direction of the axis. For the example shown in FIG. 1A, primary winding 138, secondary winding 142, and balance shield winding 144 may be axial windings, while the transverse shield wire $N_T$ 140 may be a transverse winding.

In the illustrated example of FIG. 1A, secondary winding 142 is coupled to rectifier 116, which is exemplified as a diode. Secondary winding 142 is coupled to the anode of the rectifier 116 through node P6 154. However, in some embodiments, rectifier 116 may be a transistor used as a synchronous rectifier. Both the output capacitor 118 and the load 124 are coupled to the rectifier 116. In the example of FIG. 1A, both the output capacitor 118 and the load 124 are coupled to the cathode of the diode. An output is provided to the load 124 and may be provided as either an output voltage $V_O$ 122, output current $I_O$ 120, or a combination of the two.

The power converter 100 further comprises circuitry to regulate the output, which is exemplified as output quantity $U_O$ 126. A sense circuit 130 is coupled to sense the output quantity $U_O$ 126 and to provide feedback signal $U_{FB}$ 132, which is representative of the output quantity $U_O$ 126. As will be discussed in more detail with respect to FIG. 2, the sense circuit 130 may sense the output quantity from an auxiliary winding of the energy transfer element 110. In another embodiment, the sense circuit 130 may sense the output quantity $U_O$ 126 directly from the output of the power converter 100 through a circuit, such as an optocoupler. In general, the output quantity $U_O$ 126 is either an output voltage $V_O$ 122, output current $I_O$ 120, or a combination of the two.

Controller 134 is coupled to the sense circuit 130 and receives feedback signal $U_{FB}$ 132 from the sense circuit 130. The controller 134 further includes terminals for receiving the current sense signal 135 and for providing the drive signal 136 to switch S1 112. The current sense signal 135 may be representative of the switch current $I_D$ 137 in switch S1 112. In addition, the controller 134 provides drive signal 136 to the switch S1 112 to control various switching parameters. Examples of such parameters may include switching frequency, switching period, duty cycle, or respective on and off times of the switch S1 112.

In the example of FIG. 1A, input voltage $V_{IN}$ 108 is positive with respect to input return 114, and output voltage $V_O$ 122 is positive with respect to output return 128. The example of FIG. 1A shows galvanic isolation between the input return 114 and the output return 128. In other words, a dc voltage applied between input return 114 and output return 128 will produce substantially zero current. Therefore, circuits electrically coupled to the primary winding 138 are galvanically isolated from circuits electrically coupled to the secondary winding 142.

In operation, the power converter 100 of FIG. 1A provides output power to the load 124 from an unregulated input $V_{IN}$ 108. The power converter 100 utilizes the energy transfer element 110 to transfer energy between the primary 138 and secondary 142 windings. Switch S1 112 is opened and closed in response to the drive signal 136 received from the controller 134. It is generally understood that a switch that is closed may conduct current and is considered on, while a switch that is open cannot conduct current and is considered off. In the example of FIG. 1A, switch S1 112 controls a current $I_D$ 137 in response to controller 134 to meet a specified performance of the power converter 100. In some embodiments, the switch S1 112 may be a transistor and the controller 134 may include integrated circuits and/or discrete electrical components. In some embodiments, controller 134 and switch S1 112 may be included together into a single integrated circuit. In one example, the integrated circuit is a monolithic integrated circuit. In another example, the integrated circuit is a hybrid integrated circuit.

The operation of switch S1 112 also produces a time varying voltage $V_P$ across the primary winding 138. By transformer action, a scaled replica of the voltage $V_P$ may be produced across the secondary winding 142, the scale factor being the ratio that is the number of turns $N_S$ of secondary winding 142 divided by the number of turns $N_P$ of primary winding 138. The switching of switch S1 112 also produces a pulsating current at the rectifier 116. The secondary current in the rectifier 116 is filtered by output capacitor 118 to produce a substantially constant output voltage $V_O$ 122, output current $I_O$ 120, or a combination of the two at the load 124.

The sense circuit 130 senses the output quantity $U_O$ 126 to provide the feedback signal $U_{FB}$ 132 to the controller 134. In the example of FIG. 1A, the controller 134 also receives the current sense input 135 which represents the sensed switch current $I_D$ 137 in the switch S1 112. The switch current $I_D$ 137 may be sensed in a variety of ways, such as, for example, the voltage across a discrete resistor or the voltage across the transistor when the transistor is conducting. The controller 134 outputs drive signal 136 to operate the switch S1 112 in response to various system inputs to substantially regulate the output quantity $U_O$ 126 to the desired value. With the use of the sense circuit 130 and the controller 134, the output of the switched mode power converter 100 is regulated in a closed loop.

As mentioned above, every conductive element in a power converter may be electrically coupled to the space external to the power converter through an electric field. As such, there may be a voltage between every conductive element in the power converter and an arbitrary reference location outside of the power converter. The coupling of the electric field and the associated voltage are typically represented as stray capacitance (or impedance) in an electric circuit. When the voltage between a conductive element and earth changes value, a displacement current in the stray capacitance which couples the conductive element to earth may be generated. A displacement current may refer to a changing electric field in space that is equivalent to a movement of electric charge in a conductive element.

Balance shield winding 144 may be included in the energy transfer element 110 and may be utilized to offset displacement current due to the stray capacitance between the primary winding 138 and secondary winding 142. In some embodiments, the energy transfer element 110 may utilize a transverse shield wire $N_T$ 140 to offset displacement currents partially due to the primary winding 138, secondary winding 142, and the core of the energy transfer element 110. In other words, the energy transfer element 110 may utilize the transverse shield wire $N_T$ 140 to keep displacement current within the energy transfer element 110. In particular, the transverse shield wire $N_T$ 140 may be utilized to offset displacement current due to the stray capacitance between the primary winding 138 and the core of the energy transfer element.

Figure 1B:
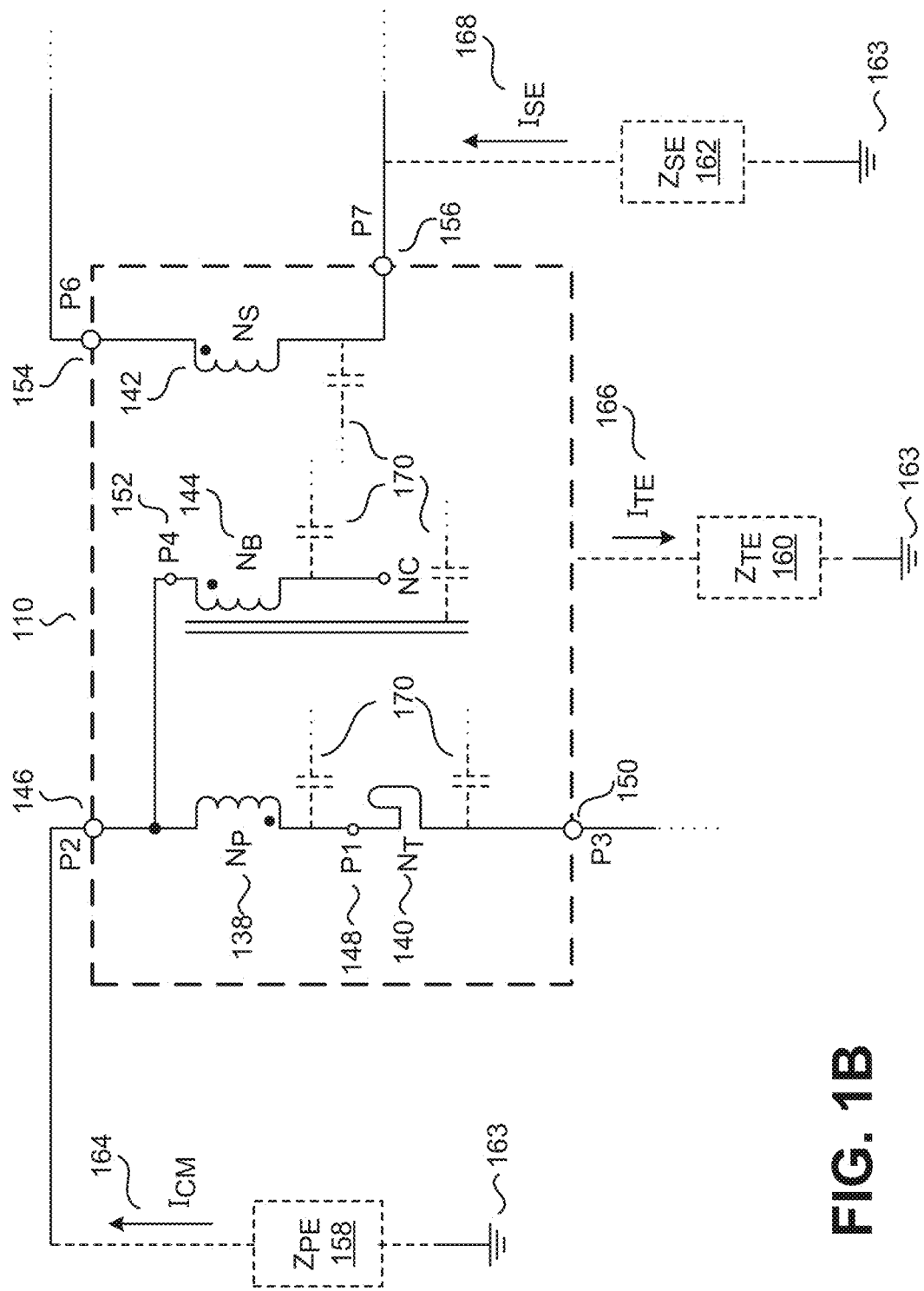
FIG. 1B is a schematic diagram of an example portion of the power converter of FIG. 1A illustrating stray capacitance and noise currents, in accordance with teachings of the present disclosure.

FIG. 1B is a schematic diagram of an example portion of the power converter 100 illustrating stray capacitance and noise currents within the energy transfer element 110. Illustrated in FIG. 1B are general stray impedances $Z_{PE}$ 158, $Z_{TE}$ 160, and $Z_{SE}$ 162, earth ground 163, noise currents $I_{CM}$ 164, $I_{TE}$ 166, and $I_{SE}$ 168, and internal stray capacitances 170. Stray impedances $Z_{PE}$ 158, $Z_{TE}$ 160, and $Z_{SE}$ 162 and internal stray capacitances 170 are drawn in dashed lines to illustrate the concept that there is a voltage between every conductive element in the power converter and an arbitrary reference location outside of the power converter.

General stray impedances $Z_{PE}$ 158, $Z_{TE}$ 160, and $Z_{SE}$ 162 represent the coupling between various parts of the power converter 100 and earth ground 163. Stray impedances $Z_{PE}$ 158, $Z_{TE}$ 160, and $Z_{SE}$ 162 are generally dominated by capacitance but they may contain inductive and resistive elements as well. The switching of switch S1 112 (shown in FIG. 1A) produces a switching voltage across the switch S1 112 that produces noise currents $I_{CM}$ 164, $I_{TE}$ 166, and $I_{SE}$ 168 in stray impedances $Z_{PE}$ 158, $Z_{TE}$ 160, and $Z_{SE}$ 162, respectively. Noise current $I_{CM}$ 164 is related by values of circuit components to noise current $I_{TE}$ 166 in stray capacitance $Z_{TE}$ 160 and noise current $I_{SE}$ 168 in stray capacitance $Z_{SE}$ 162. In general, the values of stray impedances are not within the designer's control. However, properties of the balance shield winding 144 and the transverse shield wire $N_T$ 140 may be adjusted to reduce noise current $I_{CM}$ 164. For example, the number of turns $N_B$ of the balance shield winding 144 may be adjusted to reduce noise current. In some embodiments, the shape and size of the transverse shield wire $N_T$ 140 and/or the gauge of wire utilized for the transverse shield wire $N_T$ 140 may be adjusted to reduce noise current $I_{CM}$ 164.

Also illustrated are internal stray capacitances 170 of the energy transfer element 110 that couple the primary winding 138, secondary winding 142, balance shield winding 144, and the transverse shield wire $N_T$ 140 to earth ground 163. The stray capacitances 170 are shown as uncoupled on one end to illustrate the concept that there is a voltage between every conductive element in the power converter and an arbitrary reference. In addition, it is understood that the internal stray capacitances 170 are lumped representations of actual distributed capacitances that couple displacement currents throughout the structure of the energy transfer element. The switching of switch S1 112 produces displacement currents in internal stray capacitances 170.

Embodiments may utilize a transverse shield wire $N_T$ 140 to offset displacement currents in internal stray capacitances. Balance shield winding 144 may also be included in energy transfer element 110 to offset the displacement currents produced in the internal stray capacitances 170. In particular, the transverse shield wire $N_T$ 140 may be utilized to offset the displacement current due to the stray capacitance between the primary winding 138 and the core of the energy transfer element. Properties of the balance shield winding 144 and the transverse shield wire $N_T$ 140 may be adjusted to offset displacement currents within the energy transfer element 110. For example, the number of turns $N_B$ of the balance shield winding 144 may be adjusted. In some embodiments, the shape and size of the transverse shield wire $N_T$ 140 and/or the gauge of wire utilized for the transverse shield wire $N_T$ 140 may be adjusted to offset displacement currents within the energy transfer element 110.

Figure 2:
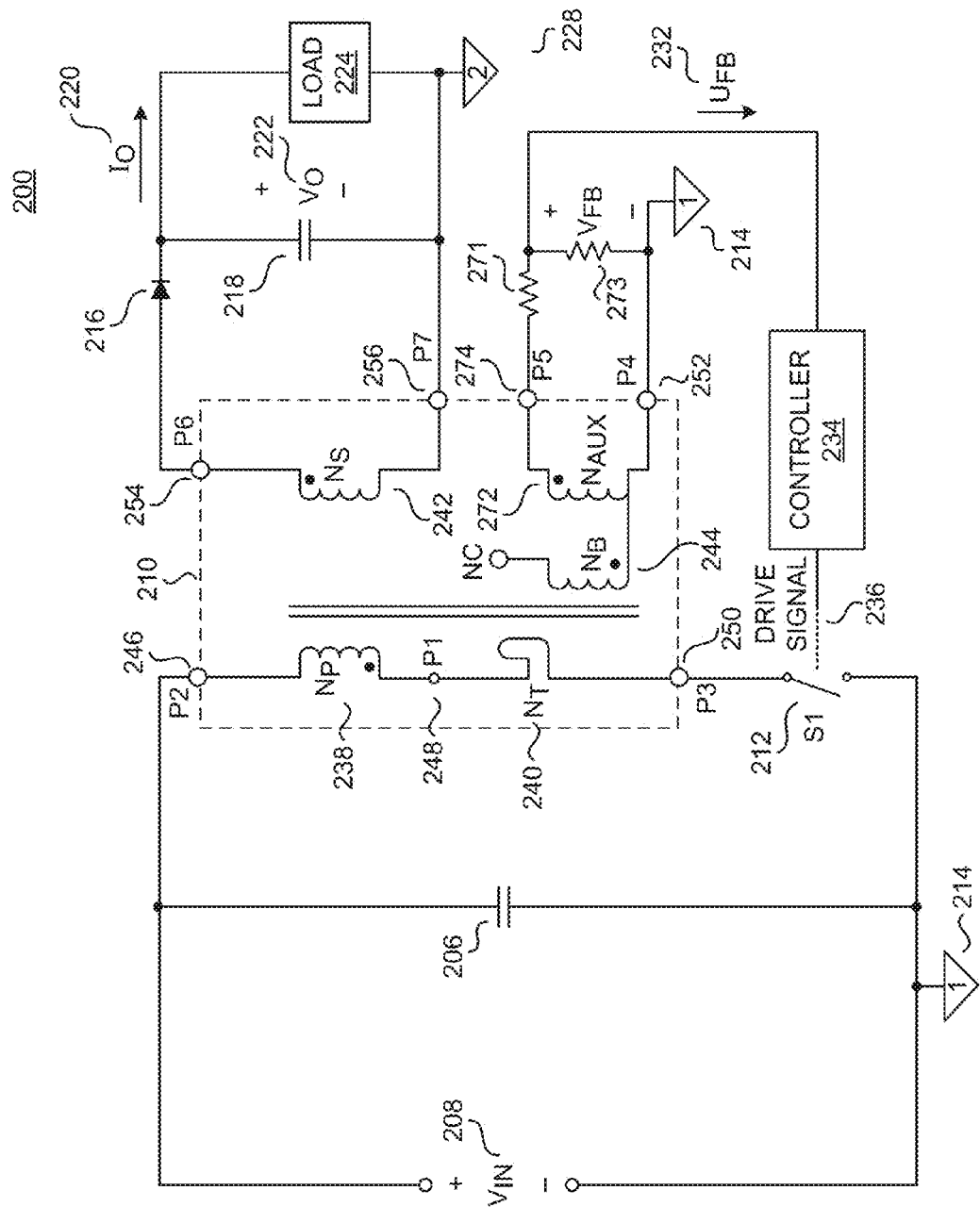
FIG. 2 is a schematic diagram illustrating another example power converter including an energy transfer element, in accordance with teachings of the present disclosure.

FIG. 2 is a schematic diagram illustrating an example power converter 200 for receiving an input voltage $V_{IN}$ 208 and providing an output to load 224 in the form of an output voltage $V_O$ 222, output current $I_O$ 220, or a combination of the two. $V_{IN}$ 208 may be positive with respect to input return 214, and output voltage $V_O$ 222 may be positive with respect to output return 228. Power converter 200 may include energy transfer element 210 utilizing a transverse shield wire $N_T$ 240. Power converter 200 is one possible implementation of power converter 100 and provides further details to the sense circuit 130 and the energy transfer element 210. Energy transfer element 210 is shown as including primary winding 238, transverse shield wire 240, secondary winding 242, balance shield winding 244, an auxiliary winding 272, and nodes P2 246, P1 248, P3 250, P4 252, P6 254, P7 256, and P5 274. In FIG. 2, the sense circuit is illustrated as including auxiliary winding 272 and resistors 271 and 273. Auxiliary winding 272 may be another power winding of the energy transfer element 210 that provides a bias voltage to operate a component of the controller 234.

In the illustrated embodiment, the auxiliary winding 272 and resistors 271 and 273 provide feedback signal $U_{FB}$ 232 to the controller 234. For the example shown, the voltage across resistor 273 (feedback voltage $V_{FB}$) is utilized as the feedback signal $U_{FB}$ 232. Resistors 271 and 273 are utilized to scale down the voltage of the auxiliary winding 272. As such, feedback voltage $V_{FB}$ is a scaled version of the voltage across the auxiliary winding 272. In operation, the auxiliary winding 272 produces a voltage that is responsive to the output voltage $V_O$ 222 when the rectifier 216 conducts. Feedback voltage $V_{FB}$ and feedback signal $U_{FB}$ 232 are representative of the output voltage $V_O$ 222 during at least a portion of an off-time of switch S1 212. During the on-time of the switch S1 212, the auxiliary winding 272 produces a voltage that is representative of the input voltage $V_{IN}$ 208. Further, auxiliary winding 272 may also provide a source of power to the circuits within controller 234.

It is appreciated that many variations are possible in the use of an auxiliary winding to sense an output voltage $V_O$ 222 and for providing sensing while also providing power to a controller with galvanic isolation. For example, an auxiliary winding may be coupled to a rectifier and a capacitor similar to rectifier 216 and capacitor 218, respectively, to produce a dc bias voltage while providing an ac feedback signal from the anode of the rectifier. As such, additional passive components, such as resistors, may be used on the auxiliary winding 272 to scale the voltage from the winding to a value that is more suitable to be received by controller 234.

Energy transfer element 210 is similar to energy transfer element 110 shown in FIGS. 1A and 1B, with the added auxiliary winding 272 and node P5 274. In addition, balance shield winding 244 is coupled to the auxiliary winding 272 rather than the primary winding as shown in FIGS. 1A and 1B. As illustrated, the auxiliary winding 272 has $N_{AUX}$ number of turns and is coupled between nodes P5 274 and P4 252. One end of auxiliary winding 272 (the end denoted with the dot) is coupled to resistor 271 through node P5 274 while the other end of auxiliary winding is coupled to resistor 273 and input return 214 through node P4 252. Nodes P5 274 and P4 252 are examples of external nodes. Further, one end (the end denoted with a dot) of the balance shield winding 244 is coupled to one end (the end without the dot) of the auxiliary winding and node P4 252. The other end of the balance shield winding 244 is uncoupled and denoted with the label "NC." Similar to above, the balance shield winding 244 may be included to offset displacement current due to the stray capacitance between the primary winding 238 and secondary winding 242.

The energy transfer element 210 shown in FIG. 2 also illustrates the transverse shield wire 240 which is coupled between node P1 248 and node P3 250. As illustrated, one end of the transverse shield wire $N_T$ 240 is coupled to the primary winding 238 through node P1 248 while the other end of the transverse shield wire $N_T$ 240 is coupled to switch S1 212 through node P3 250. Node P3 212 is an example of both an external node and a switching node. However it should be appreciated that one end of transverse shield wire $N_T$ 240 may be coupled to any switching node of the power converter 200 and the other end of transverse shield wire $N_T$ 240 may be coupled to any winding. Another example of a switching node is node P6 254. Thus, the transverse shield wire $N_T$ 240 may be coupled between node P6 254 and the secondary winding 242.

Energy transfer element 210 may utilizes a transverse shield wire $N_T$ 240 to offset displacement currents partially due to the primary winding 238, secondary winding 242, and the core of the energy transfer element 210. In other words, the energy transfer element 210 may utilize the transverse shield wire $N_T$ 240 to keep displacement current within the energy transfer element 210. In particular, the transverse shield wire $N_T$ 240 may be utilized to offset displacement current due to the stray capacitance between the primary winding 238 and the core of the energy transfer element.

Figure 3A:
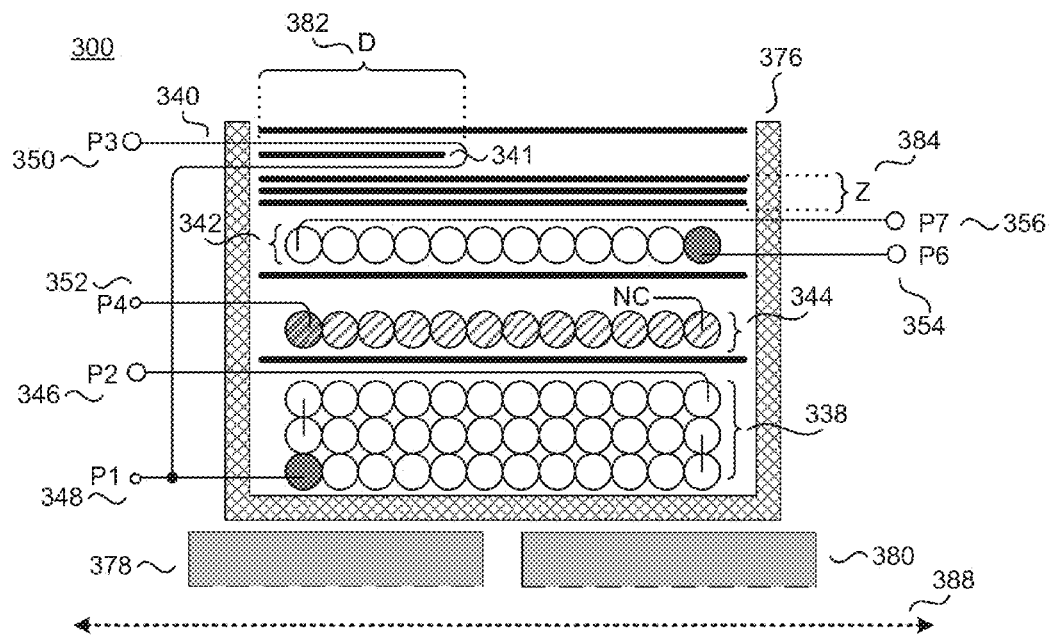
FIG. 3A is a cross section of the example energy transfer element of FIG. 1A, in accordance with teachings of the present disclosure.

FIG. 3A is a cross section of example energy transfer element 300, which is one example of the energy transfer element shown in FIGS. 1A and 1B, including primary winding 338, transverse shield wire 340, secondary winding 342, balance shield winding 344, node P2 346, node P1 348, node P3 350, node P4 352, node P6 354, node P7 356, a bobbin 376, a first portion of core 378, a second portion of core 380. Further illustrated in FIG. 3A is a distance D 382, a distance Z 384, and an axis 388. It should be appreciated that the cross section illustrates a portion of the energy transfer element 300 as the various windings are would around the axis 388 and is generally symmetrical around axis 388. In addition, nodes P2 346, P1 348, P3 350, P4 352, P6 354, and P7 356 may correspond to pins, terminals, posts, or pads that are mounted to the bobbin 376. However, nodes P2 346, P1 348, P3 350, P4 352, P6 354, and P7 356 may also refer to electrical nodes.

The energy transfer element 300 includes a bobbin 376, which is a structure upon which coils of wire (also referred also as windings or loops) are mounted and generally separates the windings from the core of the energy transfer element 300. The core is generally made of a magnetically active material, such as ferrite or steel. The bobbin 376 generally includes an opening into which the core may be inserted so that the windings can encircle the core. In the illustrated example, the core has a first portion 378 and a second portion 380 which are inserted into the opening of the bobbin 376 from opposite ends. The area around the bobbin 376 where the windings can be wound is often referred to as the bobbin window.

Primary winding 338 is wound around the bobbin 376 (and therefore around the first and second portion of the core 378 and 380) and around axis 388. The cross section of the coils of wire that represent the primary winding 338 is shown as circles with the darker shaded circle indicating the polarity of the primary winding 338 with respect to the other windings. In other words, the darker shaded circle corresponds to the dot indicating polarity of the windings shown in FIG. 1A. It should be appreciated that the number of circles shown that correspond to the cross section of the coils of wire for each winding is a representation only and should not be regarded as the number of turns in any one winding. The primary winding 338 is wound such that the end with the darker shaded circle is coupled to node P1 348 while the other end is coupled to node P2 346. In one example, the primary winding 338 is wound around the bobbin 134 times. In one example, the primary winding 338 may be wound in three rows, the first row having 46 turns, the second row having 46 turns, and the third row having 42 turns.

The balance shield winding 344 is wound around the bobbin 376 (and therefore around the first and second portion of the core 378 and 380) and around axis 388. The cross section of the coils of wire that represent the balance shield winding 344 is shown as circles with hatched lines with the darker shaded circle with hatched lines indicating the polarity of the balance shield winding 344 with respect to the other windings. The balance shield winding 344 is wound such that the end with the darker shaded circle is coupled to node P4 352 and the other end of the balance shield winding 344 is not connected, as indicted by the label "NC." The bold line between the primary winding 338 and balance shield winding 344 corresponds to a layer of inductive tape disposed between the primary winding 338 and balance shield winding 344. The layer of inductive tape may be wound around the primary winding 338 prior to winding the balance shield winding 344 around the bobbin 376. Although the example only shows one layer of inductive tape, it should be appreciated that multiple layers may be utilized.

Secondary winding 342 is also wound around the bobbin 376 (and therefore around the first and second portion of the core 378 and 380) and around axis 388. The cross section of the coils of wire that represent the secondary winding 342 is shown as circles with the darker shaded circle indicating the polarity of the secondary winding 342 with respect to the other windings. The secondary winding 342 is wound such that the end with the darker shaded circle is coupled to node P6 354 and the other end is coupled to node P7 356. In one example, nodes P6 354 and P7 356 may correspond to pins, terminals, posts or pads of the bobbin 376. However, in another example, nodes P6 354 and P7 356 may correspond to an electrical node and the coil of wire utilized for the secondary winding 342 may be coupled as discussed above to components of the power converter without coupling to a pin, terminal, post, or pad of the bobbin 376. In one embodiment, the secondary winding 342 may be wound with 11 turns. The bold line between the secondary winding 342 and balance shield winding 344 corresponds to a layer of inductive tape disposed between the secondary winding 342 and balance shield winding 344. The layer of inductive tape may be wound around the balance shield winding 344 prior to winding the secondary winding 342 around the bobbin 376. Although the example only shows one layer of inductive tape, it should be appreciated that multiple layer may be utilized.

Transverse shield wire 340 may be coupled to node P1 348 and node P3 350. Primary winding 338, balance shield winding 344, and the secondary winding 342 may be referred to as axial windings, as they are wound around the axis 388 of the bobbin. Transverse shield wire 340, however, is situated such that the transverse shield wire 340 crosses multiple power windings of the energy transfer element in a direction transverse to axis 388. In the example of FIG. 3A, the transverse shield wire 340 is situated above the secondary winding 342 and separated from the secondary winding 342 by multiple layers of insulating tape (as shown by the three bold lines). The distance between the transverse shield wire 340 and the secondary winding 342 is indicated by distance Z 384. In some embodiments, the shorter the distance Z 384, the more current the transverse shield wire 340 may generate. Another layer of insulating tape 341 covers a portion of the transverse shield wire 340. The layer of insulating tape 341 may be utilized to set the distance D 382. For example, a portion of the transverse shield wire 340 coupled to node P1 348 may be situated over the secondary winding 342 and insulating tape 341 may be disposed on top of that portion of the transverse shield wire 340 to hold it in place. The remaining portion of the transverse shield wire 340 may then be configured to couple to node P3 350. The transverse shield wire 340 may then be covered by another layer of insulating tape, as illustrated by the bold line above transverse winding 340 and insulating tape 341. In some examples, transverse shield wire 340 may be formed from the same wire used to form primary winding 338. In other examples, transverse shield wire 340 may be formed from a separate wire made of the same or a different material than primary winding 338.

Various characteristics of the transverse shield wire 340, such as the thickness of the wire utilized for the transverse shield wire 340, the distance Z 384, distance D 382, and the amount of area of the bobbin which the transverse shield wire 340 encloses may contribute to the amount of displacement current that the transverse shield wire 340 may generate. In particular, various properties of the transverse shield wire 340 may be chosen such that the displacement currents are restricted within the energy transfer element. As illustrated, the transverse shield wire 340 is coupled to the primary winding 338. In one example, the thickness of wire (also referred to as the wire gauge) utilized for the transverse shield wire 340 may be different from the wire gauge of the primary winding 338. However, the wire gauges for the transverse shield wire 340 and the primary winding 338 may be the same thickness and therefore the same coil of wire may be used for both the primary winding 338 and transverse shield wire 340. In some embodiments, the thicker the wire utilized for the transverse shield wire 340, the greater the displacement current generated by transverse shield wire 340. In other words, if a thicker the wire is utilized, the distance D 382 may be shorter and the area that the transverse shield wire 340 encloses may be smaller. On the other hand, a longer distance D 382 (and hence larger area enclosed) may correspond to more current if the wire gauge stays constant. Further, the distance Z 384 may also affect the amount of displacement current that the transverse shield wire 340 may generate. In some embodiments, the shorter the distance Z 384, the greater the displacement current generated by transverse shield wire 340.

As mentioned above, for energy transfer elements utilizing low profile bobbins, the bobbin window may be quite small and can limit the number of windings or the number of turns per winding. Utilizing a transverse shield wire may provide a similar function to a shield winding without utilizing the same amount of space on the bobbin.

Figure 3B:
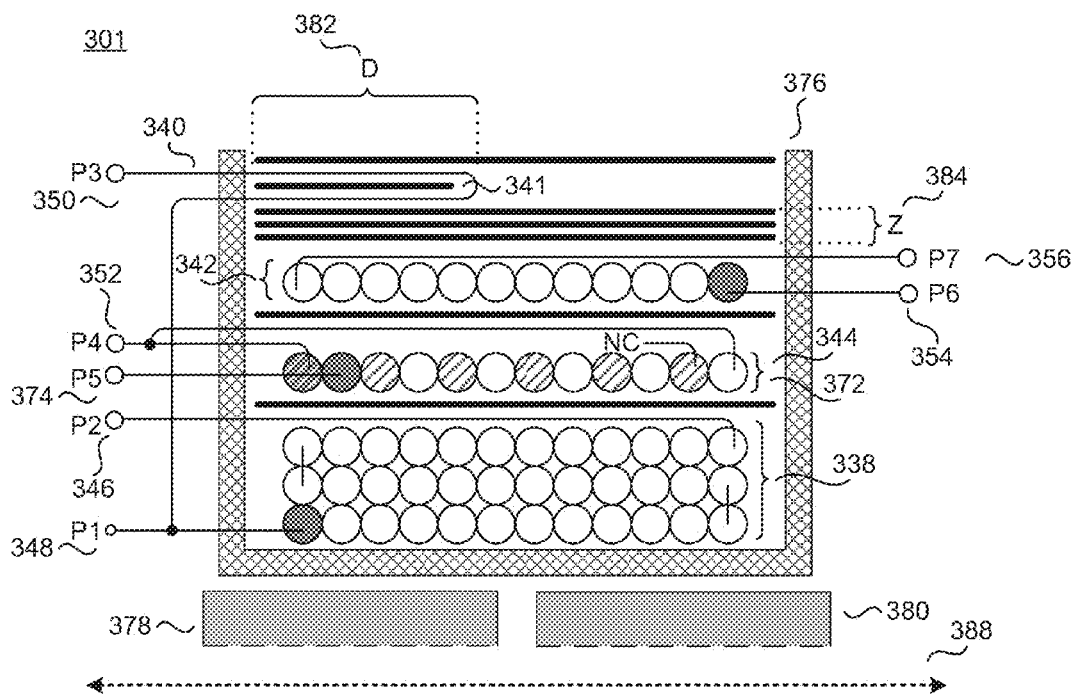
FIG. 3B is a cross section of the example energy transfer element of FIG. 2, in accordance with teachings of the present disclosure.

FIG. 3B is a cross section of the example energy transfer element 301, which is one example of the energy transfer element shown in FIG. 2, including primary winding 338, transverse shield wire 340, secondary winding 342, balance shield winding 344, auxiliary winding 372, node P2 346, node P1 348, node P3 350, node P4 352, node P6 354, node P7 356, node P5 374, bobbin 376, a first portion of core 378, a second portion of core 380. Further illustrated in FIG. 3B is distance D 382, distance Z 384, and axis 388. It should be appreciated that the cross section illustrates a portion of the energy transfer element 301 as the various windings are would around the axis 388 and is generally symmetrical around axis 388. In addition nodes P2 346, P1 348, P3 350, P4 352, P6 354, P7 356, and P5 374 may correspond to pins, terminals, posts, or pads which are mounted to the bobbin 376. However, nodes P2 346, P1 348, P3 350, P4 352, P6 354, P7 356, and P5 374 may also refer to electrical nodes.

Similarly named and numbered elements shown in FIG. 3B couple and function as described above with respect to FIG. 3A. However, FIG. 3B further illustrates auxiliary winding 372. In the example shown, auxiliary winding 372 is wound with the balance shield winding 344. The cross section of the coils of wire which represent the auxiliary winding 372 is shown as circles with the darker shaded circle indicating the polarity of the auxiliary winding 372 with respect to the other windings. Further, the balance shield winding 344 is shown as circles with hatched lines. The balance shield winding 344 and the auxiliary winding 372 are wound around the bobbin 376 (and therefore around the first and second portion of the core 378 and 380) and around axis 388. The auxiliary winding 372 is wound such that the end with the darker shaded circle is coupled to node P5 374 and the other end is coupled to node P4 352. The balance shield winding 344 may be wound such that the end with the darker shaded hatched circle is coupled to node P4 352 and the other end is not connected, as indicated by "NC."

Similar to above, the bold lines above and below the auxiliary winding 372 and balance shield winding 344 correspond to insulating tape that may be wound around the bobbin 376. The bold line under the auxiliary winding 372 and balance shield winding 344 may be wound around the primary winding 338 prior to winding the auxiliary winding 372 and balance shield winding 344 and the bold line above the auxiliary winding 372 and balance shield winding 344 may be wound around the auxiliary winding 372 and balance shield winding 344. Although the example only shows one layer of inductive tape, it should be appreciated that multiple layers may be utilized. The auxiliary winding 372 and balance shield winding 344 may both be wound with the same or different number of turns. In one example, the auxiliary winding 372 and balance shield winding 344 may each have 16 turns.

Figure 4A:
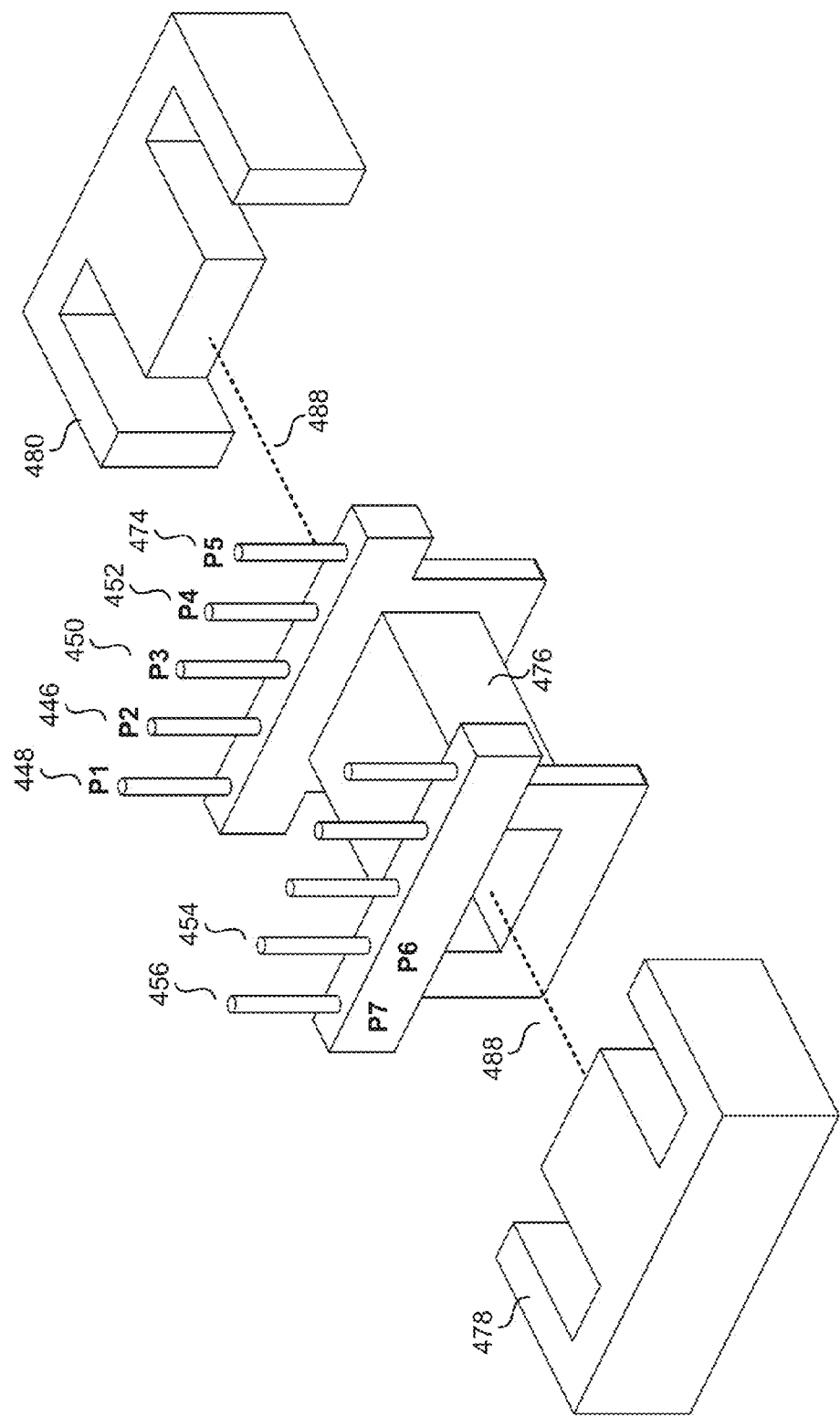
FIG. 4A is an exploded view illustrating an example energy transfer element, in accordance with teachings of the present disclosure.

FIG. 4A is an exploded view illustrating an example energy transfer element which may be one example of the energy transfer elements discussed above. The example energy transfer element may include node P2 446, node P1 448, node P3 450, node P4 452, node P6 454, node P7 456, node P5 474, bobbin 476, first portion of core 478, second portion of core 480. Further illustrated is axis 488. FIG. 4A illustrates the bobbin 476 of the energy transfer element without the first 478 and second portion 480 of the core inserted into the bobbin 476.

Bobbin 476 is a structure that provides support for coils of wire and also provides an area for a core of magnetically active material (such as ferrite or steel) to be inserted such that the coils of wire may encircle the core. As shown, nodes P1 448, P2 446, P3 450, P4 452, P5 474, P6 454, and P7 456 are mounted onto the bobbin 476. In one example, the nodes P1 448, P2 446, P3 450, P4 452, P5 474, P6 454, and P7 456 can be through-hole mount or surface mount nodes and can include a conductive material, such as metal and/or other suitable conductive material. The nodes P1 448, P2 446, P3 450, P4 452, P5 474, P6 454, and P7 456 may be used to terminate various axial windings and the transverse shield wire. Although the figure illustrates ten nodes mounted onto the bobbin 476, it should be appreciated that any number of nodes may be mounted onto the bobbin 476. The nodes P1 448, P2 446, P3 450, P4 452, P5 474, P6 454, and P7 456 may correspond to the nodes discussed above with respect to FIGS. 1A, 1B, 2, 3A, and 3B.

Bobbin 476 is configured to have coils of wire wound around axis 488 of the bobbin 476. These coils of wire may correspond to the axial windings discussed above. The bobbin 476 further includes an opening which the first portion 478 and second portion 480 of the core may be inserted into. As illustrated, the first 478 and second 480 portions of the core are inserted into the bobbin 476 along axis 488. The first portion 478 and second portion 480 of the core are coupled together to substantially enclose the bobbin 476. The first 478 and second 480 portions of the core can be coupled together using an adhesive, such as glue, tape, and/or other suitable adhesive.

Figure 4B:
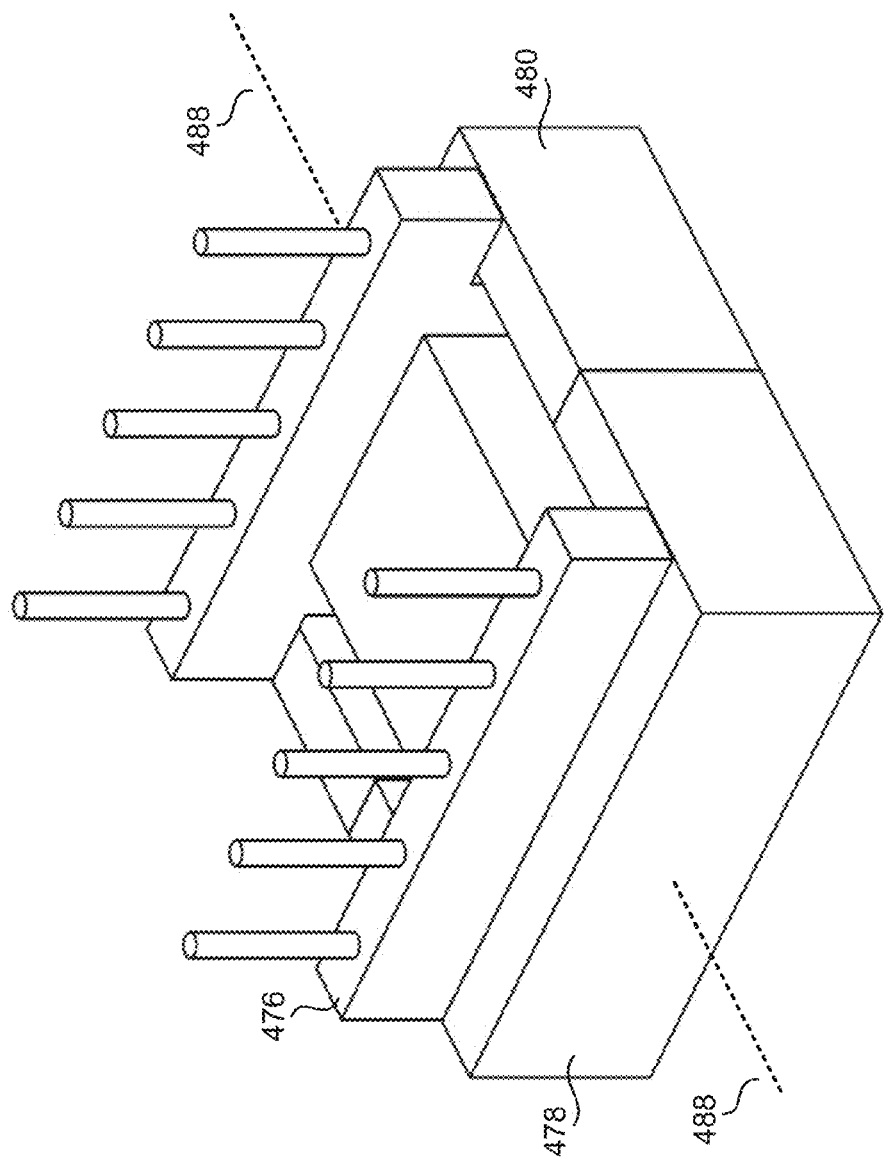
FIG. 4B is a perspective view further illustrating the example energy transfer element, in accordance with teachings of the present disclosure.

FIG. 4B is a perspective view further illustrating the example energy transfer element of FIG. 4A. The example energy transfer element may include bobbin 476, first portion of the core 478, and the second portion of the core 480. The perspective shown in FIG. 4B illustrates the first 478 and second 480 portions of the core inserted into the bobbin 476.

FIG. 4C is a further perspective view illustrating the example energy transfer element of FIGS. 4A and 4B including node P1 448, node P3 450, bobbin 476, transverse shield wire 440, and insulating tape 490. Further illustrated in FIG. 4C is axis 488 and distance D 482. The perspective shown illustrates the energy transfer element after the various windings (such as the primary and secondary windings) are wound around the bobbin 476 and the transverse shield wire 440 is placed onto the energy transfer element. Distance D 482 corresponds to distance D 382 shown in FIGS. 3A and 3B. In addition, insulating tape 490 corresponds to the insulating tape between the secondary winding and transverse shield wire shown in FIGS. 3A and 3B. It should be appreciated that the insulating tape 341 discussed with respect to FIGS. 3A and 3B is not shown. As illustrated, the transverse shield wire 440 is coupled to node P1 448 and node P3 450. The distance D 482 as shown is the distance between the bobbin 476 and the farthest point on the transverse shield wire 440 away from the bobbin 476.

Various properties of the transverse shield wire are further illustrated in FIG. 4D. FIG. 4D illustrates a top view of the energy transfer element shown in FIGS. 4A, 4B, and 4C. As mentioned above, various characteristics of the transverse shield wire 440 such as the thickness of the wire utilized for the transverse shield wire 440, the distance Z, distance D 482, and the area A 492 of the bobbin which the transverse shield wire 440 encloses may contribute to the amount of displacement current that the transverse shield wire 440 may generate. Transverse shield wire 440 is coupled to node P1 448 and node P3 450. The area A 492 shown in FIG. 4D corresponds to the area of the energy transfer element the transverse shield wire 440 encloses. In particular, the area A 492 corresponds to the area that the transverse shield wire 440 encloses and covers the axial windings wound around the bobbin 476.

These properties of the transverse shield wire 440 may be selected such that the displacement currents are restricted within the energy transfer element. For example, the thicker the wire utilized for the transverse shield wire 440, the greater the displacement current generated by transverse shield wire 440. Additionally, the greater the area A 492, the greater the displacement current generated by transverse shield wire 440. The smaller the distance Z between transverse shield wire 440 and the underlying axial windings, the greater the displacement current generated by transverse shield wire 440. One of ordinary skill can modify some or all of these properties of the transverse shield wire 440 to generate a desired amount of displacement current. Additionally, one of ordinary skill can modify one or more of these properties to utilize a transverse shield wire 440 having one or more properties falling within a desired range. For example, to reduce the distance Z between transverse shield wire 440 and the underlying axial windings, the area A and/or the thickness of the transverse shield wire 440 can be increased to produce the same amount of displacement current. In another example, to reduce the length of the transverse shield wire 440, the thickness of the transverse shield wire 440 can be increased, the shape formed by transverse shield wire 440 can be adjusted to increase area A, and/or the distance Z can be decreased to produce the same amount of displacement current. Other similar modifications can be made to any or all of the properties of transverse shield wire 440 to generate a desired amount of displacement current using a transverse shield wire 440 having one or more desired properties.

As mentioned above, transverse shield wire 440 may be formed from the same wire as the primary winding of the energy transfer element. In these examples, the wire can be wound around node P1 448 and subsequently wound around the axis of bobbin 476 to form the primary winding. However, an extra length of wire can be left opposite the primary winding around node P1 448 to be later used as transverse shield wire 440. Thus, after winding the primary winding, insulating tape, auxiliary winding and/or balance shield winding, insulating tape, secondary winding, and insulating tape, the extra length of wire of the primary winding can be bent across the surface of the upper layer of insulating tape (shown as insulating layer 490) and coupled to node P3 450 to form area A. In other examples, a separate wire of the same or different material can be coupled between nodes P1 448 and node P3 450 to form area A after winding the primary winding, insulating tape, auxiliary winding and/or balance shield winding, insulating tape, secondary winding, and insulating tape around the window of bobbin 476.

As mentioned above, for energy transfer elements utilizing low profile bobbins, the bobbin window may be quite small and can limit the number of windings or the number of turns per winding. Utilizing a transverse winding may provide a similar function to a shield winding without utilizing the same amount of space on the bobbin.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An energy transfer element comprising:
a bobbin;
a primary winding wound around an axis of the bobbin between a first end of the bobbin and a second end of the bobbin;
a secondary winding wound around the axis of the bobbin between the first end of the bobbin and the second end of the bobbin; and
a transverse shield wire having a first end and a second end, wherein the first end of the transverse shield wire is coupled to a first terminal mounted to the bobbin, wherein the second end of the transverse shield wire is coupled to a second terminal mounted to the bobbin, wherein the first end of the transverse shield wire is coupled to the first end of the bobbin, wherein the transverse shield wire extends between the first and second terminals and in a direction transverse to the primary winding and the secondary winding, wherein the transverse shield wire encloses an area that extends between the first and second ends of the bobbin a distance that is less than a distance between the first end of the bobbin and the second end of the bobbin along the axis of the bobbin.

2. The energy transfer element of claim 1, wherein the transverse shield wire is formed from the same wire as the primary winding.

3. The energy transfer element of claim 1, wherein the transverse shield wire forms a loop extending in the direction transverse to the primary winding and the secondary winding.

4. The energy transfer element of claim 1, wherein the transverse shield wire extends over a plurality of turns of the primary winding and a plurality of turns of the secondary winding in the direction transverse to the primary winding and the secondary winding.

5. The energy transfer element of claim 1, further comprising a first insulating layer wound around the primary winding.

6. The energy transfer element of claim 1, further comprising an auxiliary winding wound around the axis of the bobbin.

7. The energy transfer element of claim 6, further comprising a second insulating layer wound around the auxiliary winding, wherein the secondary winding is wound around the second insulating layer.

8. The energy transfer element of claim 1, further comprising a third insulating layer wound around the secondary winding, wherein the transverse shield wire is placed on the third insulating layer.

9. The energy transfer element of claim 1, further comprising a balance shield winding wound between the primary winding and the secondary winding.

10. The energy transfer element of claim 1, further comprising:
a first external node for coupling to an external circuit, wherein a first end of the primary winding is coupled to the first external node; and
a second external node for coupling to the external circuit, wherein a first end of the transverse shield wire is coupled to the second external node, and wherein a second end of the primary winding is coupled to a second end of the transverse shield wire.

11. The energy transfer element of claim 1, wherein the transverse shield does not enclose the axis of the bobbin.

12. A power converter comprising:
a power switch;
a controller for controlling the power switch; and
an energy transfer element comprising:
a bobbin;
a primary winding wound around an axis of the bobbin between a first end of the bobbin and a second end of the bobbin;
a secondary winding wound around the axis of the bobbin between the first end of the bobbin and the second end of the bobbin; and a shield wire having a first end and a second end, wherein the first end of the shield wire is coupled to a first terminal mounted to the bobbin, wherein the second end of the shield wire is coupled to a second terminal mounted to the bobbin, wherein the first end of the shield wire is coupled to the first end of the bobbin between the primary winding and the power switch, wherein the shield wire extends between the first and second terminals and in a direction transverse to the primary winding and the secondary winding, wherein the shield wire encloses an area that extends between the first and second ends of the bobbin a distance that is less than a distance between the first end of the bobbin and the second end of the bobbin along the axis of the bobbin.

13. The power converter of claim 12, wherein the energy transfer element further comprises an auxiliary winding for providing a feedback signal to the controller.

14. The power converter of claim 13, wherein the energy transfer element further comprises:
   a first insulating layer wound around the primary winding, wherein the auxiliary winding is wound around the first insulating layer;
   a second insulating layer wound around the auxiliary winding, wherein the secondary winding is wound around the second insulating layer; and
   a third insulating layer wound around the secondary winding, wherein the shield wire is placed on the third insulating layer.

15. The power converter of claim 14, further comprising a balance shield winding wound between the first insulating layer and the second insulating layer.

16. The power converter of claim 15, wherein a first end of the balance shield winding is coupled to the auxiliary winding, and wherein a second end of the balance shield winding is uncoupled.

17. The power converter of claim 14, wherein the shield wire is not wound around an axis of the bobbin.

18. The power converter of claim 12, wherein the shield wire extends over a plurality of turns of the primary winding and a plurality of turns of the secondary winding in the direction transverse to the primary winding and the secondary winding.

19. The power converter of claim 12, wherein the shield wire forms a loop extending in the direction transverse to the primary winding and the secondary winding.

20. The power converter of claim 12, wherein the shield wire and the primary winding form a contiguous wire.

* * * * *